Feb. 3, 1959
A. G. THOMAS
2,871,767
COMPENSATING SYSTEM FOR DRIVES
Filed Feb. 20, 1956
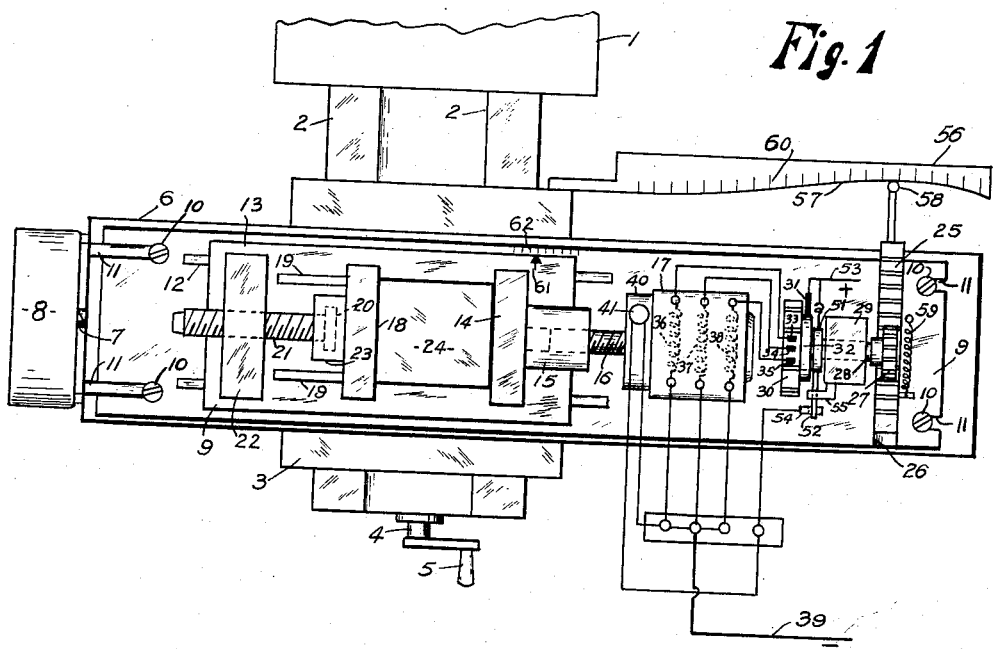
Albert G. Thomas
INVENTOR.

United States Patent Office 2,871,767
Patented Feb. 3, 1959

2,871,767

COMPENSATING SYSTEM FOR DRIVES

Albert G. Thomas, Chattanooga, Tenn., assignor to Industrial Controls Corporation, Chattanooga, Tenn., a corporation of Tennessee Application February 20, 1956, Serial No. 566,694

4 Claims. (Cl. 90—22)

This invention relates to mechanical drives, in general, and particularly to means for compensating screw feeds or other drives for wear or other irregularities.

This invention constitutes an improvement on inventions described in my copending applications Serial No. 295,694, filed June 20, 1952, now issued as Patent Number 2,774,922; Serial No. 406,740, filed January 28, 1954, now Patent No. 2,782,354; Serial No. 436,653, filed June 14, 1954; Serial No. 448,021, filed August 5, 1954, now Patent No. 2,837,670; and Serial No. 452,949, filed August 30, 1954, now Patent No. 2,806,987.

In machine tools and other devices having members moved by screws or the like the drive such as a screw, for instance, often does not wear uniformly or is made with non-uniform portions.

It is an object to provide compensating means or mechanism to provide uniform displacement of a machine member or a device even though the screw feed or other drive is not uniform.

Another object is to provide compensating means for a screw feed which means will provide uniform displacements of a member driven by said screw feed, for equal angles of rotation of the screw, regardless of lack of uniformity of wear of the screw.

A further object is to provide a compensation system for screw feeds or the equivalent, including a step motor of a type as described in one or more of the above listed patent applications.

Other objects will be evident in the following description.

In the drawings:

Figure 1 is a fragmentary top plan view, of a milling machine or other machine tool having a table moved by a screw, and including my screw feed compensating system.

Figure 2 is a left end view of the step motor, shown in Figure 1, showing my solenoid operated brake.

Figure 3 is a part sectional elevation of a rotary coupling of Figure 1.

Figure 4 is a front elevation of a shaft-driven reversing switch of Figure 1.

In Figure 1, machine tool frame 1 has attached tracks 2 on which slide 3 may be moved horizontally. This slide may be adjusted in position by rotating driving screw 4 by means of handle 5 or by means of a motor, as desired. Table 6 is movable across slide 3 as a result of rotating screw 7 which may be turned by motor 8 attached to the table or by means of a handle. Upper plate 9 is fastened to table 6 by means of bolts 10 fitted into table grooves 11 and clamped by suitable nuts. Plate 9 has projecting trapezoidal tracks 12 upon which slide 13 may be moved. This slide has bottom grooves fitting over tracks 12 so that slide 13 may be shifted in direction parallel to the direction of movement of table 6. Slide 13 need be moved only a short distance relative to table 6, just enough to compensate for uneven wear in screw 7 or for similar non-uniformity in the system.

Vise jaw 14 is fixed to slide 13 and has integral boss or shoulder 15 which is bored and threaded to receive threaded shaft 16 extending from step motor 17 which is fastened to plate 9. A flexible coupling may be placed between threaded shaft 16 and the motor shaft. The other vise jaw 18 is slidable on tracks 19 extending up from slide 13 and this jaw may be moved to the right or left by means of flange 20 of screw 21 which may be rotated in a threaded hole in block 22 attached to slide 13. Flange 20 works in a circular groove in boss 23 extending from jaw 18, in order to move the jaw to clamp or release workpiece 24, being held in relative lateral position by bored, threaded plug 23a as shown in Figure 3.

Rack 25 is slidable in groove 26 in plate 9. This groove is aligned at right angles to the direction of travel of table 6. Pinion 27 attached to shaft 28 is meshed with rack 25 and is rotatable in bearing 29 attached to plate 9. Commutator 30 is rotated by attached shaft 28 and has brush 31 yieldingly pressed against connected slip ring 32.

Brushes 33, 34, and 35 are spaced so that a commutator bar will strike them consecutively before the next succeeding bar strikes the first brush. These brushes are in contact with the commutator periphery and are connected wtih respective stator windings 36, 37, and 38 the other terminals of which are connected to negative line 39. Current is distributed to these windings in a sequence depending upon the direction of rotation of commutator 30, to produce forward or reverse rotation of the rotor. This step motor has three spaced stator sections or phases with the same number of poles in each phase. The stator poles are in circumferential alignment and the three associated rotor units have the same number of poles as the associated stator units. The rotors are mounted on a common shaft and the rotor poles of the three units are phased so that when any stator winding is energized the associated rotor poles will be magnetically pulled into register and the rotor poles of the next phase will overlap the associated stator poles so that further step rotation of the rotor will occur when the next stator phase is energized. Reversing the order of energization of the first and third phases causes the motor to reverse.

In order to prevent the rotor from oscillating, brake unit 40 having casing 40a and, controlled by solenoid 41, is provided. The construction of this unit is shown in Figure 2. Sleeve 42 is rotatable around shaft 16 and carries attached arm 43 which has roller 44 caged by lugs 43a and 43b extending from arm 43 by projecting lugs 43a and the roller is normally held in contact with cam surface 45 and the periphery of disc 46 which is fastened to shaft 16 and rotates with it. Cam 45—47 is fastened to the adjacent motor end plate 49 by means of screws and this cam has oppositely inclined surfaces 45 and 47 approaching disc 49 more closely than the diameter of roller 44. Tension spring 48, fastened to arm 43 and to motor plate 49, normally urges arm 43 to rotate counter clockwise about shaft 16 until roller 44 is forced against cam surface 45 and disc 46. The pinching action of the roller prevents counter-clockwise rotation of the disc and motor shaft but allows free clockwise rotation thereof I have found that reliable operation of the step motor is not feasible without the brake which prevents backswing of the rotor. If the brake is not used the rotor tends to oscillate about each aligned position of the rotor and stator teeth and the frequency of oscillation is often not the same as the frequency of application of current sequentially to the respective stator windings 36, 37, 38. The result is that the rotor sometimes rotates forward when it should rotate in reverse direction, and vice versa. The brake stops the rotor in the most advanced position for each step. Therefore there is no appreciable backswing for either direction of rotation since the brake is adjusted for change of direction as described. The result is that reliable rotation is obtained. The brake is especially important for the lower speeds.

When it is desired to reverse the direction of rotation of the rotor, solenoid 41 attached to plate 49 is energized. The plunger of the solenoid then quickly pulls arm 43 over, through the agency of stiff spring 50 so that roller 44 is brought into contact with disc 46 and cam surface 47. This allows counter clockwise rotation of the disc and motor shaft but prevents clockwise rotation thereof.

Band or ring 51 is fastened around shaft 28 (Fig. 1) with spring loaded frictional slipping connection so that the shaft can continue to rotate even though the band is stationary. This band is insulated from the shaft 28 and is electrically connected with positive line 53 by means of a flexible connection. Contact arm 52 is fastened to band 51 and is limited in movement by contact 54 in one direction and by stop arm 55 in opposite direction. This stop arm is fastened to support 29 and contact 54 is supported on suitable insulation material. Contact 54 is electrically connected with one terminal of solenoid 41 the other terminal of which is connected with negative line 39. Therefore when arm 52 touches contact 54, current is supplied to the solenoid which then sets the brake for reverse rotation as described. Details are shown in Figure 4.

Bar 56 is attached to slide 3 and has edge 57 curved in such manner that stylus 58 and attached rack 25 will be displaced from a reference plane in accordance with variations in uniformity of screw 16. The curve 57 may be calibrated by turning screw 16 through equal angles and then shaping the curve according to plus or minus actual lateral displacements of table 6 as compared to equal displacements for a perfect screw. Tension spring 59 is attached to plate 9 and to a pin extending from rack 25. This spring urges stylus 58 against surface 57. If corrections are plus the curve will be on one side of the reference plane and if minus, the curve will be on the opposite side of the reference plane.

In operation, workpiece 24 is clamped between jaws 18 and 14 and stylus 58 is set at a starting point relative to scale 60 of bar 56. This initial setting may be accomplished by moving table 6 relative to slide 3 by rotating shaft 7, or by moving index mark 61 on slide 13 relative to scale 62 on plate 9 by rotating threaded shaft or screw 16. Then if motor 8, which may be a step motor, is automatically controlled by a tape control system, or by punched cards or the equivalent, the step motor 17 will be supplied phased currents from commutator 30 which is moved forward or reverse in accordance with movements of stylus 58 which movements are in accordance with the configuration of curved or inclined surface 57. Therefore screw 16 will be rotated through proper angles to move slide 13 and workpiece 24 to the right or left the correct distances to compensate for irregularities or lack of accuracy of screw 7 and associated table drive mechanism.

When shaft 28 is rotated in a direction so that the commutator bars distribute current to brushes 33, 34, and 35 to energize field windings 36, 37, and 38 in an order producing forward rotation of motor 17, arm 52 is brought up against insulated stop 55 by slipping friction band 51. When however, rotation of shaft 28 is in the opposite direction, corresponding to reverse rotation of motor 17, arm 52 quickly touches contact 54 and causes current to pass through the winding of solenoid 41 thereby causing roller 44 to be brought quickly against cam surface 47, for reverse rotation of motor 17. The length of arm 52, or amplifying mechanism may be adjusted so that a very small reverse movement of shaft 28 will cause the solenoid circuit to be closed. A snap-over spring, or detents or the like, may be used to effect a definite opened or closed circuit condition of arm 52 and contact 54.

The curved or sloped template or guide 57 may be replaced by a drawing, and stylus 58 may be replaced by a lamp and photocell system in conjunction with circuits as described in my co-pending application, Serial No. 373,187 filed August 10, 1953. In this way the rack 25 may be automatically moved by the photocell line follower system as table 6 is moved to the right or left. This system has the advantage that the drawing is easy to make but the control circuitry is more complicated than the mechanical system illustrated.

While automatic compensation for movement of a machine member along one axis is described, it is obvious that similar compensation systems may be applied to other machine members along coordinate or other axes, and to other types of drives such as racks, gears, and the like. Furthermore the specific mechanism shown is not the only means of accomplishing the desired results since levers or other mechanism may be substituted for the rack and pinion shown, and other alternative means such as cam-operated contacts may be substituted for the commutator. Similarly, other alternative devices or components may be used.

What I claim is:

1. In a machine tool, a table, means for moving said table linearly relative to a support therefor, means attached to said table for holding a workpiece and movable relative to said table in direction parallel with the direction of said linear movement, means including power means for producing said relative movement of said workpiece holding means, gauge means supported by said machine tool and shaped in accordance with variations from uniformity of said table moving means, and means including means for sensing said gauge means for controlling said power means to cause compensating movement of said workpiece holding means in accordance with sensings of said gauge means.

2. In a machine tool, a table, means supporting said table for linear movement thereof relative to said supporting means, means including a first screw for producing said linear movement of said table, means carried by said table for holding a workpiece, means including another screw for producing compensating movement of said workpiece holding means relative to said table, in direction parallel with said linear movement, gauge means attached to said supporting means and having a configuration in accordance with variations from uniformity of said first screw, power means for rotating said other screw, and means including means for sensing said gauge means for controlling said power means in accordance with sensings of said gauge means.

3. In a machine tool, a table, supporting means for said table providing linear movement thereof relative to said supporting means, a first screw for producing the said linear movement of said table, means including a first motor for rotating said first screw, means carried by said table for holding a workpiece, means for guiding said workpiece holding means for travel relative to said table in direction parallel with the direction of said linear movement, an other screw operably attached at one end to said workpiece holding means for causing movement thereof in opposite directions, a plural phase step motor carried by said table and attached to said other screw at the other end for causing rotation thereof, a gauge member fastened to said supporting means and shaped to correspond to variations from uniformity of said first screw, a rack supported by said table and movable therewith, and also movable at right angles to the direction of said linear movement thereof, means including a rotary switch for distributing current sequentially to the phases of said step motor, gear means connecting said rack and said rotary switch, a feeler element extending from said rack and adapted to be in contact with said gauge member as said table is moved, and resilient means yieldingly pressing said feeler element against said gauge member.

4. In a machine tool, a table, supporting means for said table providing linear movement thereof relative to said supporting means, a screw for producing the linear movement of said table, means including a first motor for rotating said screw, means carried by said table for holding a workpiece, means carried by said table for guiding said workpiece holding means for travel relative to said table in either direction parallel with the direction of said linear movement, mechanism for producing the relative travel between said table and said workpiece holding means, a plural phase step motor carried by said table and operably connected with said mechanism for driving said mechanism, a gauge member fastened to said supporting means and shaped to correspond to variations from uniformity of said screw, sensing means carried by said table and including a tracing element movements of which are controlled by said gauge member, means including current distributor means for supplying current to the phases of said motor in sequence, and means associating said current distributor means with said sensing means for causing movements of said motor in accordance with variations of said gauge member.

References Cited in the file of this patent
UNITED STATES PATENTS

| | | |
|---|---|---|
| 694,386 | Johnston | Mar. 4, 1902 |
| 2,397,108 | Hanna et al. | Mar. 26, 1946 |
| 2,412,619 | Kindermann et al. | Dec. 17, 1946 |
| 2,631,264 | Thomas | Mar. 10, 1953 |